A. F. LEWIS.
AUTOMOBILE LOCK.
APPLICATION FILED MAY 25, 1921.
1,421,353.
Patented June 27, 1922.
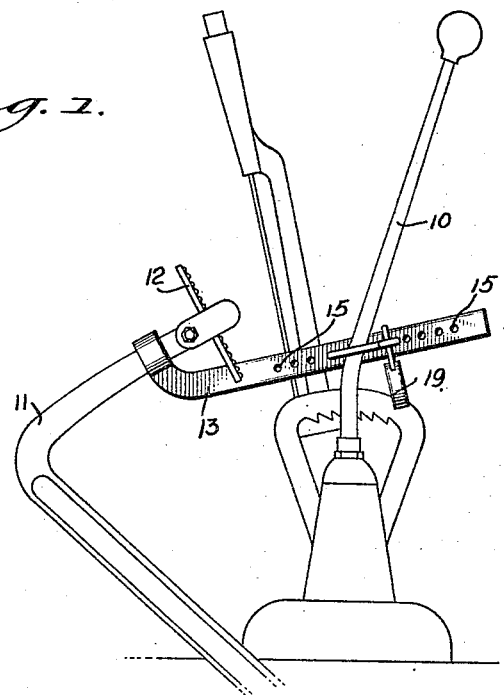
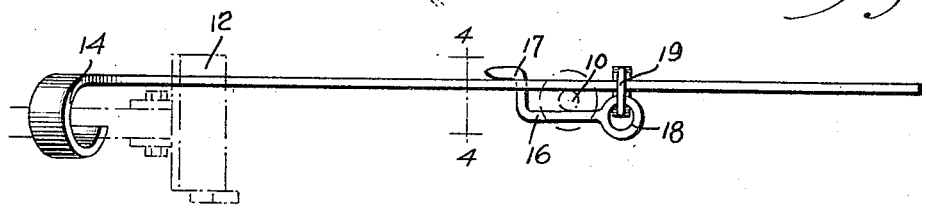
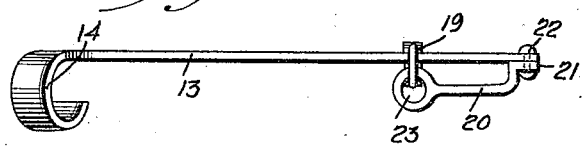
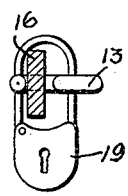
INVENTOR
A. F. LEWIS
ATTORNEYS

UNITED STATES PATENT OFFICE.

ANSON FEDORE LEWIS, OF SANTA BARBARA, CALIFORNIA.

AUTOMOBILE LOCK.

1,421,353.     Specification of Letters Patent.     Patented June 27, 1922.

Application filed May 25, 1921. Serial No. 472,522.

*To all whom it may concern:*

Be it known that I, ANSON F. LEWIS, a citizen of the United States, and a resident of Santa Barbara, in the county of Santa Barbara and State of California, have invented a new and Improved Automobile Lock, of which the following is a full, clear, and exact description.

This invention relates to locks for automobiles.

The object of the invention is to provide a simple means that may be easily applied to lock the operating levers of the machine in such relative positions that they can not be moved to put the machine in motion.

This object is accomplished by providing rigid means for fastening the brake lever when in its active position or the clutch lever when it is in inactive position to the gear change lever in any one of its positions or to any other member in front of the seat, and means for locking the rigid fastening means in position.

This invention will be more clearly understood from the following detailed specifications and accompanying drawings.

Figure 1 is a side elevation of the device connected to the automobile levers;

Figure 2 is a top plan view showing the device connected to the levers;

Figure 3 is a top plan view of the device showing a modification of the means for connecting it to the gear change lever; and Figure 4 is a cross section on the line 4—4, Figure 2.

Referring to the above-mentioned figures, 10 is the gear change lever of an automobile, and 11 either the clutch lever or brake lever having a foot-piece 12. A rigid bar 13 has an offset hook 14 for connecting it to either the brake lever or clutch lever of the machine.

In the bar a plurality of holes 15 are provided, and a pin member 16, having an offset point 17 which engages in the holes 15, is supplied. The pin member 16 has an eye 18. A padlock 19 fits through the eye member 18 and around the bar 13 and serves to lock them together.

In Figure 3, a modification of the means for connecting the bar 13 to the gear change lever is shown. Instead of the pin 16, a member 20, having an offset portion 21 which is provided with a hole, is pivotally connected with the bar 13 by means of a rivet 22. This member 20 is provided with an eye 23. The lock 19 serves to fit through the eye 23 and around the bar 13 to lock the member 20 thereto.

In applying the lock to the automobile levers, the hook 14 is fitted over the brake lever or clutch lever 11 and the bar 13 under the foot-piece 12. Then, if it is decided to connect the bar 13 to the gear change lever 10 which has been thrown into any desired position, for instance, neutral, the lever 11 is pushed forward as far as it will go and the bar 13 moved to a position alongside of the gear change lever 10. Then the offset portion 17 of the pin 16 is projected through one of the holes 15 and rotated into a position where it encloses the lever 10 between it and the bar 13, as shown in Figure 2. The lock 19 is then used to lock the pin number 16 in the above position. Thus it will be seen that the machine cannot be operated without removing the lock.

Claim:

An automobile lock comprising a bar member having an offset hook at one end for connecting it to the brake or clutch levers, a plurality of holes in the bar, a pin member having an offset on one end and an eye on the other for engaging with the bar to connect the gear change lever or some other member thereto, and a lock for locking the pin member to the bar member.

ANSON FEDORE LEWIS.